United States Patent

[11] 3,582,810

[72] Inventor Garry C. Gillette
Mesa, Calif.

[21] Appl. No. 821,890
[22] Filed May 5, 1969
[45] Patented June 1, 1971
[73] Assignee Dana Laboratories, Inc.
Irvine, Calif.

[54] FREQUENCY SYNTHESIZER SYSTEM
10 Claims, 4 Drawing Figs.

[52] U.S. Cl. .......................................................... 331/10, 331/14, 331/16
[51] Int. Cl. .......................................................... H03b 3/04
[50] Field of Search .......................................... 331/1 A, 10, 14, 16

[56] References Cited
UNITED STATES PATENTS

| | | | |
|---|---|---|---|
| 3,271,688 | 9/1966 | Gschwind et al. ............ | 331/1(A) |
| 3,395,361 | 7/1968 | Brauer.......................... | 331/14 |

*Primary Examiner*—Roy Lake
*Assistant Examiner*—Siegfried H. Grimm
*Attorney*—Nilsson and Robbins

ABSTRACT: A frequency synthesizer system is disclosed utilizing phase registration for frequency regulation and affording smooth frequency changes in accordance with a control signal. The output from a voltage controlled oscillator is tallied (cyclically) by a digital counter, the contents of which is periodically compared with the contents of an accumulator that is incremented periodically to define the desired frequency, e.g. cycles per second. The comparison provides a primary regulation signal for combination with a change-commanding signal (provided from an integrator) for application to the oscillator. The slope of the integrator output is proportional to an applied control signal and that output is monitored to detect a change that is equivalent to a digital quantity, whereupon the integrator is reset and the accumulator is incremented by the digital quantity. Fractional quantities are also accommodated by the system.

INVENTOR
GARRY C. GILLETTE

INVENTOR
GARRY C. GILLETTE

BY Nilsson + Robbins
ATTORNEYS

INVENTOR
GARRY GILLETTE

BY Nilsson + Robbins
ATTORNEYS

FREQUENCY SYNTHESIZER SYSTEM

BACKGROUND SUMMARY OF THE INVENTION

The large number of radio communication units that are presently in use has vastly increased the demand for frequency allocations. However, in spite of the present demand, allocations continue to be made so as to accommodate deviations from assigned specific frequencies. That is, as it is difficult to precisely allot frequency (because of the difficulty in precisely controlling the operating frequency of a communication unit) allocations normally are not precise. However, as the useful frequency spectrum is limited, the increased demand for frequency allocation must be provided by granting more precise allocations which can only be accomplished by the availability of systems that are capable of accomplishing more precise frequency control.

Frequency synthesizers may be defined as signal generators which are controllable to provide precise signals of different frequencies. The signals provided should not drift or vary materially from time-to-time. In the past, such units have utilized crystal oscillators, as frequency standards from which various selected frequencies can be developed. These units have generally been quite complex or have been limited in capability to providing signals of several discrete frequencies.

More recently, it has been proposed to provide a structure which is capable of producing a periodic electrical signal in which the phase is coherent with a periodic reference signal. Specifically, in such a structure, the numerical value of the desired phase is computed digitally. Such a system is disclosed in a U.S. Pat. application Ser. No. 791,912 filed Jan. 17, 1969 by Noel B. Braymer.

In the operation of a frequency synthesizer of the type disclosed therein, the need sometimes arises to perform a "-search" operation whereby an adjustable and continuous frequency offset occurs in relation to the value that is programmed to the synthesizer. It is also desirable to be able to control such variations as by computer or other external source and to avoid abrupt frequency changes, i.e. maintain an instantaneously phase-coherent and sinusoidal output, while preserving phase lock control. The present system contemplates such operation.

BRIEF DESCRIPTION OF THE DRAWINGS

In the drawings, which constitute a part of this specification, an exemplary embodiment exhibiting various objectives and features hereof is set forth, specifically.

DESCRIPTION OF THE ILLUSTRATIVE EMBODIMENT

Figure 1:
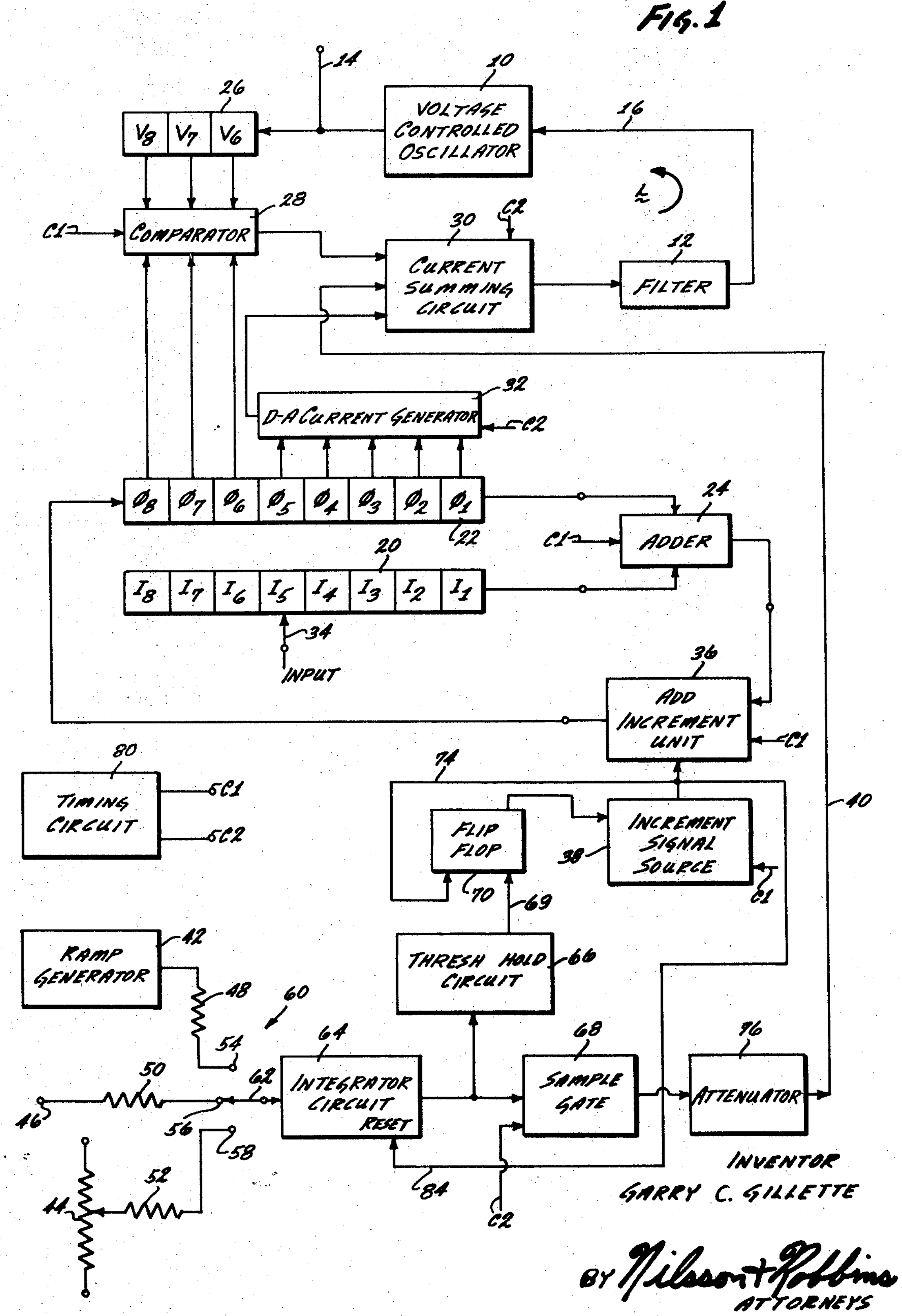
FIG. 1 is a block diagram of a system incorporating the principles of the present invention.

Referring initially to FIG. 1, there is shown a loop L (generally designated) incorporating a periodic signal source in the form of a voltage controlled oscillator 10, a filter system 12 and a control system which incorporates virtually all the other elements as shown. Very generally, the phase of the signal that is provided at a terminal 14, from the voltage controlled oscillator 10, is preserved in accordance with a changing phase value that is registered in the control system. In that regard, the control system provides a signal through the filter 12 and a conductor 16 to maintain the desired phase.

Considering the control system in somewhat greater detail, a numerical value indicative of the desired phase increment (frequency) is registered in a frequency register 20 (FIG. 1, center). The contents of the register 20 is periodically added (as an increment) to the accumulated numerical value in a phase register or accumulator 22 by an adder 24 acting under the control of a timing signal C1 as well known in the art.

As the digital capacity of the accumulator 22 is limited, it is to be recognized that overflow digits that are propagated from the accumulator result in the loss of some information on the desired value of phase. However, retention of the less significant digits of the value provide a basis for repeated comparison and control. That is, the contents of the accumulator 22 is periodically compared with the contents of a counter 26 (upper left) which tallies cycles of the oscillator 10. These units manifest the orders of magnitude less significant digits of the phase that is desired and the actual phase. In an actual system, the tolerable deviation between the phase values is limited, consequently, the digits registering the two phase values may also be limited.

As indicated in FIG. 1, the comparison between the phase value registered in the counter 26 and that in the accumulator 22 is accomplished by a comparator 28 which cyclically provides a signal through a current summing circuit 30 to the filter 12 for controlling the frequency of the oscillator 10. Structural details of the comparator 28, the current summing circuit 30 and various forms of the filter 12 are shown and described in the above-referenced patent application by N. B. Braymer.

For purposes of relating the present invention, it is primarily important to understand the operation whereby the signal from the oscillator 10 is maintained at a precise frequency by repeatedly comparing the desired phase value (registered in the accumulator 22) with the actual phase value (registered in the counter 26) and adjusting the frequency of the oscillator 10 in accordance with deviations between such values. Structurally, as explained in the referenced disclosures, the voltage controlled oscillator 10 may take various forms of such units as well known in the prior art. Similarly, the counter 26 may comprise various forms of well-known binary counters while the accumulator 22 may comprise well-known binary forms of such units. In the disclosed system, the counter 26 registers three digital stages $\phi_6$, $\phi_7$ and $\phi_8$, the outputs from which are received by the comparator 28 along with the outputs from stages of similar significance ($\phi_6$, $\phi_7$ and $\phi_8$) of the accumulator 22. The lesser stages, $\phi_1$, $\phi_2$, $\phi_3$, $\phi_4$ and $\phi_5$ of the accumulator 22, as disclosed herein, register fractional values of phase which do not directly enter into the comparison because the counter 26 tallies only full cycles of the oscillator 10.

Structurally, the register 20 may also comprise a binary unit incorporating eight digital stages $I_1$ through $I_8$, so as to provide increments to the accumulator 22 of up to three integer digits and five fractional digits. Various forms of structures suitable for use as these units are disclosed in a book entitled "Arithmetic Operations in Digital Computers" by R. K. Richards, published in 1955 by D. Van Ostrand Company, Inc.

A comparator 28 for manifesting the differential between a value that is registered in the counter 26 and that registered in the accumulator 22 (stages $\phi_6$, $\phi_7$ and $\phi_8$) may comprise a digital subtraction unit operating in cooperation with a digital-analog converter for providing a current indicative of the magnitude for the comparator difference. Various structures of this type are very well known in the prior art, e.g. digital subtractors and analog-digital converters.

Recapitulating, as explained in detail in the above-referenced disclosure, during the operation of the system, the average numerical value in the counter 26 coincides to the average numerical value in the accumulator 22. That is, the voltage controlled oscillator 10 is slaved to a "frequency" (phase increments on a time base) registered in the register 20, as a result of the comparator 28 sensing deviations between the incremented desired phase value (registered in the accumulator 22) and the actual phase value (counter in the counter 26) to provide a control signal through the loop L to regulate the voltage controlled oscillator 10. Thus, the accumulator 22 increments its contents in a step function (normally by several cycles at each increment) while the counter 26 counts individual cycles yet the average values of the two are maintained similar.

As indicated, the major control for the voltage controlled oscillator 10 is derived from the comparator 28 providing a current indicative of any deviation between the desired phase registered in the accumulator 22 and the actual phase registered in the counter 26. However, in accordance herewith, other control currents are also provided to the summing circuit 30 which supplement the current from the comparator 28. Specifically, a current is provided from a digital-analog current generator 32 which compensates for fractional values that are developed in the digital stages $\phi_1$ through $\phi_2$, which would otherwise periodically propagate an overflow digit into the stage $\phi_6$ thereby commanding a sudden phase adjustment of substantial magnitude. This arrangement is disclosed in detail in the above-referenced Braymer disclosure. However, in general, the structure results from the desirability of maintaining a consistent coherent frequency output from the oscillator 10. It is to be recognized that as the numerical value contained in the register 20 is periodically added to the contents of the accumulator 22, a fractional value will be developed in the digital stages $_1$ through $\phi_5$, which will periodically propagate an overflow digit into the stage $\phi_6$. That value, termed a residue, results in a proportionate deviation in the loop L. To compensate this deviation, the residue section (incorporating digital stages $\phi_1$ through $\phi_5$) is sensed by the digital-analog converter 32 to provide an analog current to the summing circuit 30. That is, the deviation or error of concern carried as a fractional value by the residue section of the accumulator 22, provides an analog signal for combination with major signal from the comparator 28 to correct for the residue or fractional deviation. When the contents of the digital stages $\phi_1$ through $_5$ propagate an overflow digit into the stage $\phi_6$ (thereby returning to zero for example) the digital-analog current generator 32 reduces its output to zero while the comparator 28 receives an incremented output from the stage $\phi_6$. The two changes are thus complementary and a smooth and consistent control of phase is accomplished as a result.

In view of the above preliminary description it is readily apparent that the system as described may operate effectively to maintain a desired frequency output, the history of which is faced to comply with a desired phase. However, in the operation of a system of this type, although the register 20 may be afforded with an independent input, as through a cable 34, it is sometimes desirable to alternatively change the frequency from a programmed value, in a continuous and coherent manner. The present invention is concerned with structure for accomplishing that function.

Specifically, the system hereof incorporates a unit 36 (right central) for adding increments to the output from the adder 24, the normal function of which is to add the contents of the register 20 to the accumulator 22. That is, in the operation of the system hereof to change the frequency from its programmed value, the contents of the register 20 is added to the contents of the accumulator 22 by the separately indicated adder 24. Signals representative of that sum are then supplied from the adder 24 to the unit 36 to which an increment may be supplied from an increment-signal source 38 to alter the numerical value represented by the signals, which are then returned to the accumulator 22. These increments in the desired phase registered in the accumulator 22 command an increased value of phase during a predetermined interval of time. By periodically adding increments to the values registered in the stages $\phi_1$ through $\phi_5$, changes in the frequency are commanded; however, to make the instantaneous output of the oscillator 10 phase coherent and sinusoidal, it is important to avoid such increments in the accumulator 22 to command a sudden change. In accordance herewith, a supplementary control signal current is generated and supplied to the summing circuit 30 through a conductor 40 to maintain smooth transitions in frequency.

The signal for commanding a change in frequency may be provided from any of a plurality of sources. Specifically, for example in the illustrative embodiment a control signal may be provided from a ramp generator 42 (to accomplish a sweep operation) from a potentiometer 44 or from an external source connected to a terminal 46. These sources are coupled through resistors 48, 50 and 52 respectively to the stationary contacts 54, 56 and 58 respectively of a switch 60. The movable contact 62 of the switch is connected to integrator circuit 64 which provides a signal, the slope of which is proportional to the amplitude of the received control signal. The output from the integrator is applied to a threshold circuit 66 and to a gate 68. The threshold circuit may take any of a variety of well-known forms as a Schmitt trigger which provides a high binary output through a conductor 69 to a flip-flop 70 when the received signal is above a predetermined threshold. The high state of the binary signal in the conductor 69 sets the flip-flop 70 to provide a high level of a binary signal to the increment-signal source 38. Thereupon, the increment-signal source 38 provides a digital signal representative of a numerical increment to the increment adding unit 36. It is to be noted that upon the provision of such a signal, the flip-flop 70 is reset through a conductor 74.

The ramp signal from the integrator circuit 64 is passed by the gate 68 (during the interval of a timing pulse C2) to then pass through an attenuator 76 and a conductor 40 to the current summing circuit 30. In the general operation of the system, digital increments which command a change are added to the contents of the accumulator 22 by the add increment unit 36; however, such increments are anticipated (to accomplish a smooth and continuous change) by samples of a ramp signal supplied through the conductor 40.

Figure 2:
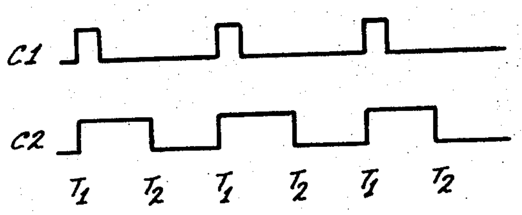
FIG. 2, 3 and 4 are waveforms of signals occuring in the system of FIG. 1.

The operation of the system as disclosed in FIG. 1 is sequenced by a pair of timing signals which are provided by a timing circuit 80. Specifically, these signals include pulses C1 and C2 which are graphically represented in FIG. 2 and identified with instants of time designated as T1 and T2. The leading edges of the pulses C1 and C2 coincide at the time T1; however, pulse C1 terminates long prior to the termination of the pulse C2 the trailing edge of which occurs at the time T2.

In the operation of this system, the contents of the register 20 is added to the contents of the accumulator 22 during the interval of C1. The control signal resulting from that comparison, and employed to correct the differential, is supplied to the current summing circuit 30 and passed therefrom (along with the other corrective currents) during a sampling interval established by the signal C2. The filter 12 therefore receives sample signals which are smoothed into a continuous value by the filter for application to the oscillator 10. It is to be noted, that the signal which compensates for fractional values (stages $\phi_1$ through $\phi_5$) is provided from the digital-analog current generator 32 during the signal C2, as is the output from the integrator 64 which is gated through the sample gate 68 under the control of the signal C2.

Figure 3:
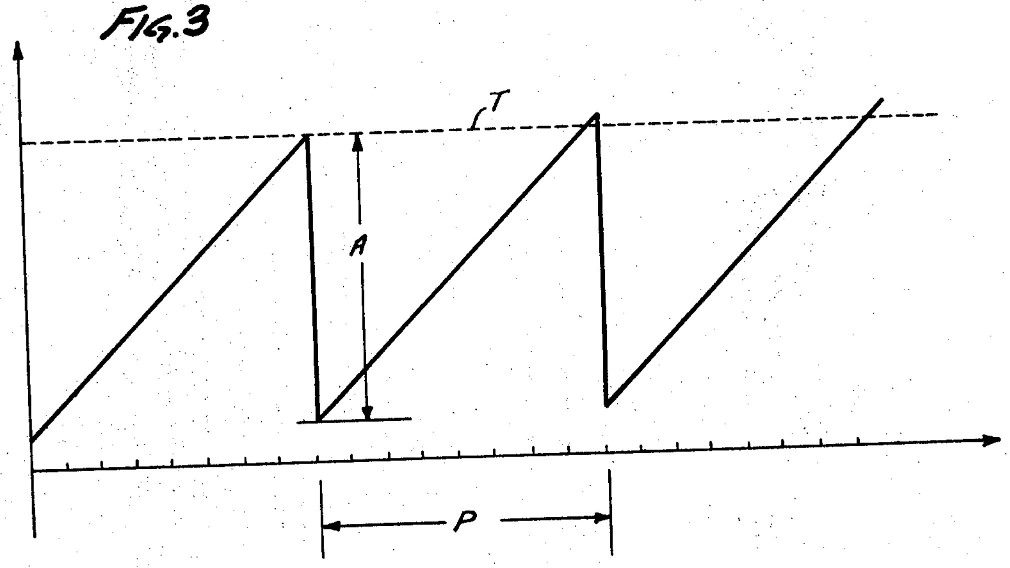

Concentrating on the operation of the integrator circuit 64, the ramp output therefrom is dependent upon the instant value of the applied current received through the switch 60. A graphic representation of the output from the integrator circuit 64 is shown in FIG. 3 as a recurring sawtooth or ramp potential. It is to be understood that the instantaneous amplitude of the output from the integrator circuit 64 is indicative of the change commanded in the frequency of the voltage controlled oscillator 10. The utilization of the integrator circuit 64 affords a smooth variation in the change (avoiding the abrupt digital change) to maintain a sinusoidal output at the terminal 14 which is phase coherent. In this regard, the period P of the ramp signals is variable as is the slope. That is, when the amplitude A of the ramp attains a predetermined level T, a digital unit of change is indicated. As a result, the output ramp from the integrator 64 is reset by a fixed amount A and an equivalent digital increment is supplied to the phase value in the accumulator 22.

Figure 4:
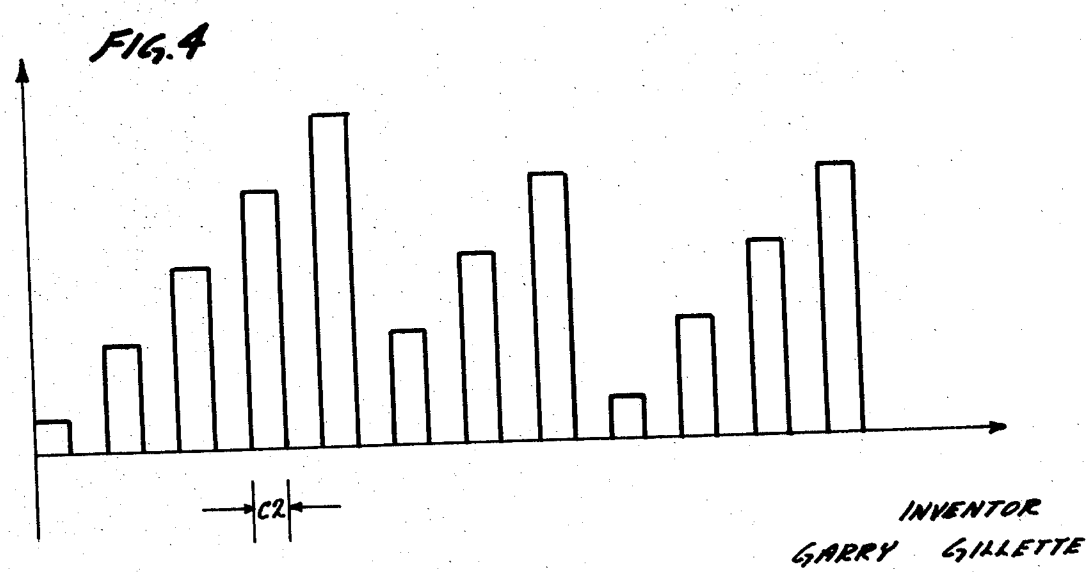

As suggested above, to utilize the output from the integrator circuit 64, it is sampled during the intervals of pulse C2 by the gate 68 to provide samples which are scaled by the attenuator 76 and applied to the summing circuit 30 during the critical sampling interval. A graphic indication of these samples is shown in FIG. 4 which is related to the integrator output as shown in FIG. 3.

In accordance with the operation of the system, the threshold circuit 66 detects the digitally equivalent amplitude A to command a digital adjustment in the contents of the accumulator 22 through the increment unit 36 and concurrently causes the integrator circuit 64 to be reset through a reset conductor 84. Considering this operation in greater detail, when the output from the integrator circuit 64 attains the predetermined threshold level of amplitude A, the threshold circuit 66 provides a high signal to set the flip-flop 70 through the conductor 69. The output of the flip-flop provides a high signal to the increment-signal source 38 until the occurrence of a pulse Cl. during which the increment-signal source provides an incremental value for combination by the increment unit 36 with the newly combined values from the accumulator 20 in the register 22. That digital increment in the contents of the accumulator 22 accounts for the value of a signal which was previously supplied through the sample gate 68 and the atenuator 76 to the summing circuit 30. Consequently, it is necessary to "clear" or reset the integrator 64 on accomplishing a digital adjustment in the contents of the accumulator 22.

The output from the increment-signal source 38 is connected through a conductor 74 to reset the flip-flop 70 and additionally through a conductor 84 to reset the integrator circuit 64. As a consequence, the integrator circuit is reset by a fixed amount A preparatory to another cycle of operation.

In the operation of this system as described above, the slope of the ramp from the integrator circuit will depend upon the amplitude of the control signal applied thereto. Consequently, time control may be accomplished to afford desired variations in accordance with signals from any of a number of different sources as indicated above. That is, the system is capable of operating to vary the frequency as for example under the control of a computer, a ramp generator or an internal control signal. Such a capability coupled with the inherent stability of the system and the economy thereof affords a significant improvement over systems of the prior art.

What I claim is:

1. A control system wherein a periodic signal source, frequency controllable by a signal, is controlled to provide a varying frequency in response to a control signal, comprising:

digital means for counting cycles of said periodic signal source;

digital register means for registering a numerical value representative of a desired number of cycles per unit of time;

digital accumulator means for accumulating numerical-value signals from said register means on a periodic bases;

means for periodically comparing the contents of said accumulator with the contents of said means for counting whereby to provide a primary signal for controlling the frequency of said periodic signal source;

means for providing a continuously variable signal in accordance with said control signal for combination with said primary signal for varying the frequency of said periodic signal source; and means for monitoring said continuously variable signal to digitally alter the contents of said accumulator means and accordingly reset said means for providing a continuously variable signal.

2. A control system according to claim 1 wherein said means for providing a continuously variable signal comprises an integrator circuit connected to receive said control signal as an input.

3. A control system according to claim 2 wherein said means for monitoring comprises a threshold circuit for sensing an increment in said continuously variable signal of digital proportions to accordingly alter the contents of said accumulator and reset said integrator circuit.

4. A control system according to claim 1 further including means for sampling said continuously variable signal to provide samples thereof for combination with said primary signal.

5. A control system according to claim 1 further including a plurality of means for providing said control signal.

6. A control system according to claim 5 wherein one of said means for providing comprises a ramp generator.

7. A control system according to claim 1 further including residue digital stages in said accumulator for registering digits of lesser significance then the least significant digit registered by said digital means for counting, and further including means for deriving an analog signal from residue stages for combination with said primary signal and said continuously variable signal to control said signal source.

8. A control system according to claim 7 wherein said means for providing a continuously variable signal comprises an integrator circuit connected to receive said control signal as an input.

9. A control system according to claim 8 wherein said means for monitoring comprises a threshold circuit for sensing an increment in said continuously variable signal of digital proportions to accordingly alter the contents of said accumulator and reset said integrator circuit.

10. A control system according to claim 9 further including means for sampling said continuously variable signal to provide samples thereof for combination with said primary signal.

UNITED STATES PATENT OFFICE
CERTIFICATE OF CORRECTION

Patent No. 3,582,810 Dated June 1, 1971

Inventor(s) Garry C. Gillette

It is certified that error appears in the above-identified patent and that said Letters Patent are hereby corrected as shown below:

Column 1, line 3, before "summary" insert -- and --; line 50, "Fig." should read -- Figs. --.

Column 2, lines 33 and 50, after "and", each occurrence, insert -- Ø --; line 41, after "through", "I" should read -- $I_8$ --.

Column 3, line 6, "02" should read -- Ø5--; line 16, before "1" insert -- Ø --; line 28, before "5" insert -- Ø --.

Column 5, line 10, "Cl." should read -- Cl., --; line 16, "atenuator" should read -- attenuator --; line 46, "bases" should read -- basis --.

Column 6, line 30, "then" should read -- than --.

Signed and sealed this 2nd day of May 1972.

(SEAL)
Attest:

EDWARD M.FLETCHER,JR.
Attesting Officer

ROBERT GOTTSCHALK
Commissioner of Patents

FORM PO-1050 (10-69)

USCOMM-DC 60376-P69
☆ U.S. GOVERNMENT PRINTING OFFICE : 1969 O—366-334